Aug. 6, 1963   E. PROPPER   3,100,290
COLUMNAR STRESS SENSING MEMBER
Filed Jan. 4, 1961
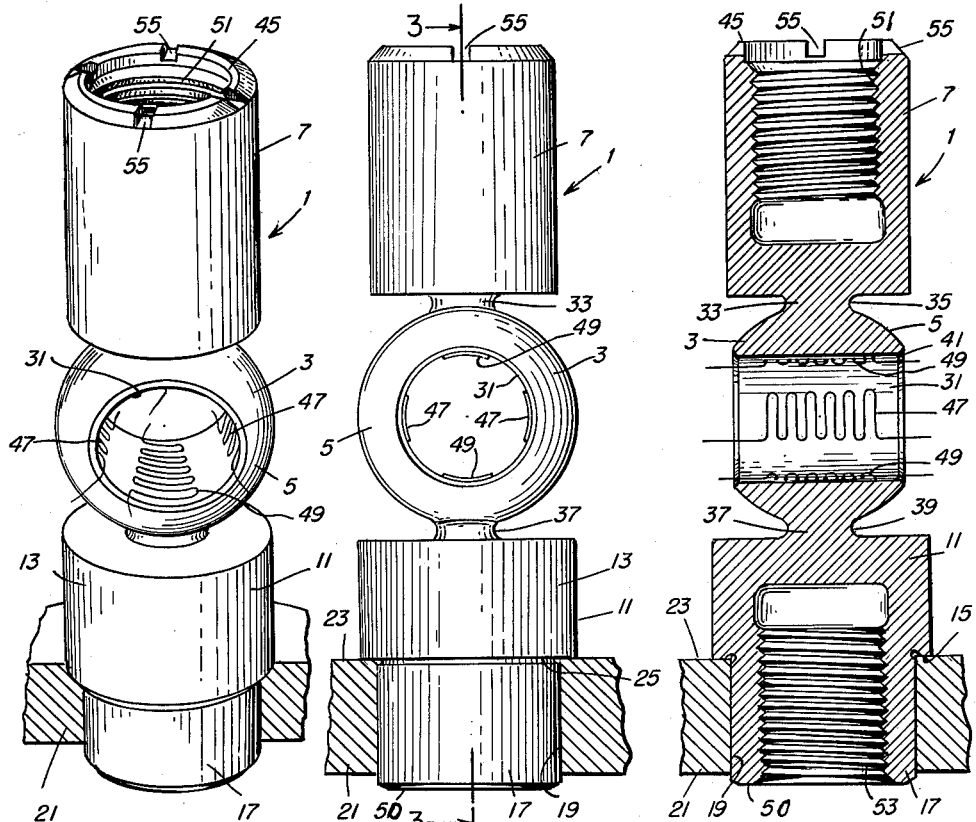
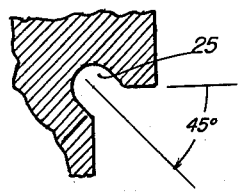
FIG.6
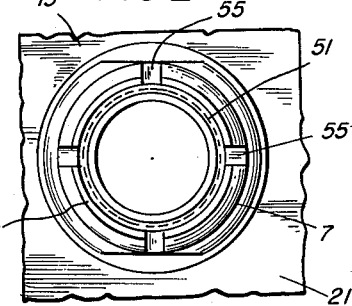
FIG.4
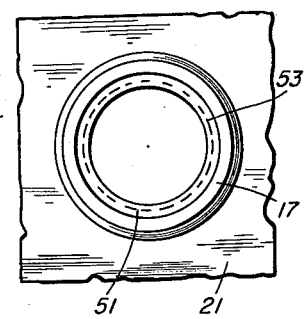
FIG.5
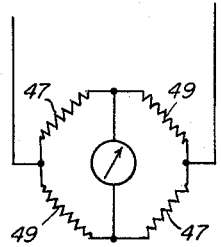
FIG.7
INVENTOR.
Eric Propper
BY John B. Cuningham
Attorney

3,100,290
COLUMNAR STRESS SENSING MEMBER
Eric Propper, Wallingford, Conn., assignor to Revere Corporation of America, Wallingford, Conn., a corporation of New Jersey
Filed Jan. 4, 1961, Ser. No. 80,685
9 Claims. (Cl. 338—5)

This invention relates to a stress measuring device and more especially to a stress sensing member for such a device. The invention particularly relates to a stress sensing member for a stress measuring device of the type known as a force transducer or as a load cell for measuring stress or load applied as compression or tension stress and providing a strain element in which strain is developed under the applied stress, strain responsive means being used for sensing the strain developed in the strain element, together with means for quantitatively indicating this response.

Stress sensing members for a force transducer or load cell of single column form to which the stress may be applied as compression or as tension lengthwise of the column heretofore have been proposed in different designs. In certain of these stress sensing members of the prior art a strain element has been utilized which provides a wall extending about an axis disposed at right angles to the line of action of the applied stress, this wall being defined by an inner cylindrical surface coaxial with this transverse axis. The exterior surface of this wall has taken different forms for various intended purposes and characteristics. Stress responsive members of this type are disclosed in the patents to A. C. Rugge 2,561,318, July 17, 1951 and 2,576,417, November 27, 1951.

The devices of these patents and others of this general "ring" type are of such configuration of the outer surfaces thereof in cooperation with the inner cylindrical surface, and the parts and connections provided in the structure for applying the stress or load to the strain element and for resisting the stress transmitted through the strain element are of such form that machining operations are difficult or involve many operational steps. Moreover, the forms of these devices and more particularly the configuration of the strain elements thereof are not of such simplicity of outline and of cross section that the strain developed in the strain element is generally uniformly distributed therein or distributed with a suitable and limited gradual change which makes possible more accurate response to the applied stress and a greater precision in the indication of the load or stress intended to be measured by the stress measuring device.

It is an object of the invention to provide a stress sensing member for a stress measuring device, transducer or load cell of simple form which may be easily manufactured.

It is another object of the invention to provide a stress sensing member for a stress measuring device in which the form of the strain element thereof is such as to develop the strain in an improved and more uniform manner.

It is a further object of the invention to provide a stress sensing member for a stress measuring device which is capable of developing strain in the strain element thereof responsive to the stress applied thereto with improved accuracy and so that the strain responsive means or strain gauges which are utilized in connection with the strain element of the device are capable of sensing and responding to the strain and of developing in a suitable instrument an indication or registration of greater precision than heretofore has been attained in stress sensing members of the type to which reference has been made.

The stress sensing member of the invention is provided with a strain element having a wall of annular form defined by an inner cylindrical surface the axis of the cylinder of which extends transversely of the line of action of the applied stress as is the case with the prior art devices to which reference is made above. The exterior surface of this annular wall of the invention, however, is of spherical form and the center of the spherical contour is disposed on the axis of the cylinder. The diameter of the cylindrical surface is less than the diameter of the sphere sufficiently to form the annular wall with a cross section suitable for the load to which the device will be subjected. The section of the wall in a plane containing the axis of the cylinder is defined by the arc of the segment of a great circle of the spherical contour and by a linear element of the cylindrical surface. The "ring" shaped strain element of the invention thus is provided by a portion of the stress sensing member which is in the form of a sphere, this sphere being provided, however, with a central space defined by the cylindrical surface the axis of which extends through the center of the sphere and intersects the line of action of the applied stress. The cylindrical central space about which the wall of spherical exterior surface contour extends is open at its ends spaced along the axis of the cylinder and strain responsive means or strain gauges may be and ordinarily are disposed upon this cylindrical surface in spaced relation to each other about the axis of the cylinder. In contrast to certain devices of the prior art, the cross section of the annular wall is both uniform about the axis of the cylinder and avoids so far as is practicable the formation of sharp corners by the intersection of angularly related surfaces. The surface of the sphere is of smooth curvature and the surface of the cylinder about its axis also is of smooth curvature. Having regard to the concentricity of the sphere and cylinder this produces an annular wall of uniform thickness.

Preferably the stress sensing member of the invention is constructed as an integral piece, suitable load or stress applying means being disposed adjacent the intersection of the line of action of the stress with the spherical contour of the strain element at a given side thereof and suitable stress resisting means being disposed at the opposite side of the strain element adjacent the intersection of the line of action of the stress with the spherical contour at this opposite side of the strain element. At these points of intersection with the spherical contour, which in the actual preferred form of the device may be on imaginary extensions of the spherical contour of the exposed portions of the sphere, operative connections are provided of suitable form and construction between the stress applying means and the sphere, on the one hand, and between the stress resisting means and the sphere, on the other hand. In the preferred embodiment where the stress sensing member is of integral form, these operative connections may be provided by portions in the form of necks integral with the spherical strain element and respectively with the stress applying means and the stress resisting means.

In broad concept, however, the connections between the stress applying means and the sphere and between the stress resisting means and the sphere may be provided substantially as point contacts with the spherical contour, suitable provision being made to maintain the sphere in position with the axis of the cylindrical surface perpendicular to and intersecting the line of action of the applied stress.

Other objects and features of the invention will be understood from the description to follow taken in connection with the drawing in which FIG. 1 shows in perspective the stress sensing member of the invention utilizing a spherical strain element;

FIG. 2 shows an elevation of the stress sensing member;

FIG. 3 shows a section on line 3—3 of FIG. 2;

FIG. 4 shows the stress responsive member as viewed at the top of FIG. 2;

FIG. 5 shows a view at the bottom of FIG. 2;

FIG. 6 shows to enlarged scale a fragmentary portion of the stress resisting part of the device and of the shoulder for engaging a support;

FIG. 7 shows a circuit and indicator for indicating the response of the strain responsive elements.

In FIGS. 1, 2 and 3 the stress sensing member 1 comprises a strain element 3 which is defined by a spherical exterior surface 5, the center of the sphere being disposed on the line of action of the stress. In the embodiment disclosed this line of action is vertical and is coincident with the axis of a stress applying part 7 which is of cylindrical form disposed above the spherical strain element 3. At the lower side of the strain element 3 a stress resisting part 11 of the device is provided of cylindrical form defined by surface 13 coaxial with the line of action of the stress. This stress resisting part 11 in the embodiment shown is formed with a shoulder 15 and a cylindrical portion 17 of reduced diameter which may be disposed in suitably fitted relation to the cylindrical opening 19 formed in a support 21. The shoulder 15 may be machined so as to bear in good bearing relation upon the machined upper surface 23 of the support 21. In order to avoid interference at the corner formed between the upper surface 23 and the surface of the opening 19 of the support 21 with the material of the stress resisting part 11 of the device at the shoulder 15, an annular groove 25 may be cut in a turning operation on the stress sensing member. This undercut groove may have the form shown in section in Fig. 6.

The strain element 3 is defined, on the one hand, by the exterior spherical surface 5 as described and, on the other hand, by a cylindrical surface 31, the axis of the cylindrical surface 31 extending through the center of the sphere and perpendicular to the line of action of the stress, that is, perpendicular to the common line of the axes of the cylindrical stress applying part 7 and of the stress resisting part 11. It will be apparent that the annular wall of the spherical strain element 3 thus secured is of segmental section as shown in FIG. 3. This wall in this embodiment is connected to the upper stress applying part 7 by a neck portion 33 defined by a surface of revolution about the line of action of the stress as an axis. In this embodiment the stress sensing member is of integral form and of homogeneous material, the neck 33 being integral with the stress applying part 7 and with the spherical strain element 3. The surface of revolution of the neck 33 preferably is of arcuate contour defined by the fillet arc 35. Similarly, the neck 37 having a surface of revolution defined by the fillet arc 39 connects the strain element 3 at the bottom part thereof to the stress resising part 11, the neck 37 being integral with the strain element 3 and with the stress resisting part 11. As may be seen in FIG. 3, the edges which would be formed by the intersection of the spherical surface with the cylindrical surface are broken by bevels 41 to avoid a sharp edge.

The upper end of the stress applying part 7 may be formed with a flat annular surface 45 for engagement with the member of a structure through which the load or force is transmitted for applying compression stress to the stress sensing member of the invention. This stress or force will be transmitted through the stress applying part 7 and through the strain element 3 to the stress resisting part 11 and thence to the support 21, so that the spherical strain element will be subjected to this compressive stress and will develop in the annular wall of segmental section strain generally along the circular path about the axis of the cylindrical surface 31. Because the cross section of the annular wall of the strain element is uniform about the axis of the cylinder and with the least number of intersections of angularly related surfaces, this strain will be generally uniform and uniformly transmitted along this circular path from the stress applying part 7 to the stress resisting part 11.

Although the neck portions 33 and 37 through which this stress in this embodiment is transmitted will slightly modify the uniformity of transmission of the stress, it is possible to provide neck portions 33, 37 of sufficient size to transmit the stress while restricting the diameter of these neck portions and the amount of the material thereof which is integrated with the material of the sphere so as not to distort greatly the uniformity of the transmission of the stress and the development of the generally uniform strain in the strain element along the arcuate path thereof for a wide range of stress or loads applied to the device within the capacity thereof.

As in all such stress measuring devices greater linearity, that is, less departure from proportionate change of the strain with given change of the applied stress or load, is desirable. In the device of the invention it is found that such linearity is attained to a high degree by virtue of the spherical form of the strain element which is provided with the cylindrical opening therethrough. This together with the uniformity of strain described provides a stress sensing member of high precision.

Accordingly, strain responsive means or strain gauges 47, 49 of any suitable type, for example, electrical impedance elements, may be mounted, ordinarily on the inner cylindrical surface 31 of the strain element 3, and will be responsive to the strain and to the applied stress with a high degree of precision and linearity. When compression is applied to the stress sensing member of the invention by a load applied to the surface 45 and resisted at the shoulder 15 in engagement with the support 21, or if desired by engagement of the bottom annular surface 50 with a part of the loaded structure being tested without intervention of the support 21, the strain gauges 47 disposed at the sides of the cylindrical surface 31 are responsive to the compression which occurs adjacent thereto in the strain element 3. The gauges 49 which are disposed on the line of action of the stress are responsive to the tension which is developed in the strain element 3 at this part of the cylindrical surface 31. These strain responsive impedance elements or strain gauges may be connected in a suitable circuit with an indicator, for example, in a bridge and galvanometer or other instrument circuit in a conventional manner, as shown in FIG. 7, for securing a quantitative indication or registration of the strain which is developed in the strain element 3 and the desired measure of the stress applied to the device.

The capacity of the stress sensing member of the invention may be varied for a strain element of given spherical diameter by varying within reasonable limits the diameter of the cylindrical surface 31. Within practical limits also the capacity may be varied by varying the diameter of the sphere for a given diameter of the cylindrical surface. The strain element of the form described makes it possible to secure a high capacity and high linearity with a minimum deflection in the strain element.

As shown in FIGS. 1 and 3 the upper stress applying part 7 of the device may be provided with an internal thread 51 into which may be screwed the threaded end of a tension member to which upward force may be applied by any suitable means. Similarly, the cylindrical portion 17 of the stress resisting part 11 of the device may be provided with an internal thread 53 into which may be screwed the threaded end of a tension member to which force is applied downwardly by any suitable means. It will be apparent, therefore, that the stress sensing member of the invention in this manner, when desired, may be used for measuring tension stress.

Because of its form the spherical strain element 3 will be strained in the uniform manner, as has been described with respect to the application of compressive stress, when the strain element is subjected to tension. In this case, however, the portions of the strain element adjacent the strain gauges 47 will be subjected to tension and the portions thereof adjacent the strain gauges 49 will be subjected to compression. The neck portions 33 and 37 may be of sufficient diameter to transmit the stress of tension within the range for which the device is designed and the desired uniformity of development of the strain and the desired linearity and high precision of the device may be secured when the stress sensing member is used for measurement of tension as well as in the case where it is used for measurement of compressive stress. In both cases it is desirable for greater precision that the cross section of the necks upon the line of action of the stress as an axis should be made as small as possible while providing sufficient cross section therein for safely transmitting the stress or load to the strain element of spherical contour. Within practical limits, therefore, the ideal of point contact application of the stress as mentioned above may be approached.

For holding the stress sensing member of the invention against turning movement when threaded members are inserted for measurement of tension in the manner described, notches 55 are provided for engagement by a suitable spanner wrench. If desired also threaded plugs may be inserted in the internally threaded parts and provided with flat or conventional convex or concave surfaces for engaging corresponding surfaces provided on the structure from which the compressive stress is received by the stress sensing member of the invention.

It now will be understood that the stress sensing member of the invention may be produced by simple machining operations. The form of the device shown in the drawings may be produced almost entirely by turning operations since all of the surfaces, including those of the cylindrical stress applying means 7 and the cylindrical stress resisting means 13, as well as the spherical surface 5 and the fillets 35, 39 of the neck portions, are surfaces of revolution about the axis of the member which is the line of action of the applied stress, or are planar perpendicular to this axis. The cylindrical surface 31 also is a surface of revolution which may be produced by a turning or by boring operation. These machining operations lend themselves to the utilization of conventional means, such as jigs and precision machine tools. Such conventional means and machining operations also may be utilized for producing internal threads for engagement with the tension members as has been described. Thus there is secured a low cost stress sensing member which is of high precision.

Within the scope of the invention the load applying part 7 and the load resisting part 11, as well as the means for engaging the support 21, may be varied in form while retaining the feature that the strain element of the invention provides an exterior spherical surface defining the outer surface of the annular wall which constitutes the strain element, the inner surface of this wall being defined by a cylindrical surface the axis of which passes through the center of the sphere and is perpendicular to the line of action of the stress applied to the device. Because of the simplicity of machining operations, however, the stress applying part 7 and the stress resisting part 11 preferably are made with surfaces of revolution, cylindrical in the specific embodiment described. All such variations are intended to be within the scope of the appended claims.

I claim:

1. A stress sensing member for a stress measuring device which comprises a strain element capable of resiliently developing strain therein under stress applied thereto, means for supporting said strain element to receive the stress acting along a given line and for transmitting the stress through said strain element concomitantly with developing the strain therein, said strain element providing an exterior spherical surface and being disposed with the center of the spherical contour positioned substantially on said line of action of the stress, said strain element being further defined by a cylindrical surface of less diameter than the diameter of the sphere and disposed within the spherical contour and extending about a cylindrical space with the axis of the cylinder substantially extending through the center of the sphere and transversely of said line of action of the stress.

2. A stress sensing member for a stress measuring device which comprises a strain element capable of resiliently developing strain therein under stress applied thereto acting along a given line of action, said strain element being defined by an exterior spherical surface disposed with the center of the spherical contour substantially on said line of action of the stress, said strain element being defined further by a cylindrical surface of less diameter than the diameter of the sphere and disposed within the spherical contour with the axis of the cylinder substantially extending through the center of the sphere and perpendicular to said line of action of the stress, said spherical and cylindrical surfaces defining in said strain element an annular wall of segmental section in a radial plane through the axis of the cylinder, said annular wall extending about a cylindrical space open at its ends and concentric with the axis of the cylinder, stress applying means disposed adjacent the intersection of said line of action with the spherical contour at a given side of the sphere and operatively connected at said side to said strain element for transmitting the stress thereto, and stress resisting means disposed adjacent the intersection of said line of action of the stress with the spherical contour at the opposite side of the sphere and operatively connected to said strain element at said opposite side for resisting the stress transmitted through said strain element to said stress resisting means.

3. A stress sensing member as defined in claim 2 in which said stress applying means is provided by a first cylindrical member disposed with the axis of the cylinder thereof coincident with said line of action of the stress and with one end thereof adjacent and operatively connected to said strain element adjacent said intersection of said line of action of said stress with said spherical contour of said strain element at said given side thereof, said stress resisting means being provided by a second cylindrical member disposed with the axis of the cylinder thereof coincident with said line of action of the stress and with one end thereof disposed adjacent and operatively connected to said strain element adjacent said intersection of said line of action of the stress with said spherical contour of said strain element at said opposite side of the sphere.

4. A stress sensing member as defined in claim 2 in which said operative connections of said stress applying means and of said stress resisting mean to said spherical strain element comprise neck portions disposed respectively between said stress applying means and the sphere of said strain element and between said stress resisting means and said sphere, said neck portions being defined by surfaces of revolution extending about the line of action of said stress.

5. A stress sensing member as defined in claim 4 in which said neck portions are integral respectively with said stress applying means and said stress resisting means and are integral with the said spherical strain element.

6. A stress sensing member as defined in claim 1 in which strain responsive means are disposed in spaced relation upon said cylindrical surface about the axis of the cylinder.

7. A stress sensing member as defined in claim 1 in which electrical impedance strain responsive elements are disposed in spaced relation upon said cylindrical surface about the axis of the cylinder.

8. A strain element for a stress measuring device and capable of resiliently developing strain therein under stress applied thereto, said strain element being defined by an exterior spherical surface and by an interior cylindrical surface of less diameter than the diameter of the sphere, said cylindrical surface being disposed with the axis of the cylinder substantially extending through the center of the spherical contour, said cylindrical surface extending about a cylindrical space open at the ends thereof that are spaced along the axis of the cylinder, said strain element being adapted to be supported to receive at the spherical contour thereof the stress acting along a given line which extends through the center of the spherical contour and with the axis of said cylindrical surface transverse to said line of action of the stress, and strain responsive elements disposed in spaced relation to each other about said axis of the cylinder upon a surface of said strain element and substantially in a plane perpendicular to the axis of said cylinder.

9. A strain element for a stress measuring device and capable of resiliently developing strain therein under stress applied thereto, said strain element being defined by an exterior spherical surface and by an interior cylindrical surface of less diameter than the diameter of the sphere, said cylindrical surface being disposed with the axis of the cylinder substantially extending through the center of the spherical contour, said cylindrical surface extending about a cylindrical space open at the ends thereof that are spaced along the axis of the cylinder, said strain element being adapted to be supported to receive at the spherical contour thereof the stress acting along a given line which extends through the center of the spherical contour and with the axis of said cylindrical surface transverse to said line of action of the stress.

References Cited in the file of this patent

UNITED STATES PATENTS

| | | |
|---|---|---|
| 1,983,368 | Hathorn | Dec. 4, 1934 |
| 2,365,015 | Simmons | Dec. 12, 1944 |
| 2,561,318 | Ruge | July 17, 1951 |
| 2,576,417 | Ruge | Nov. 27, 1951 |
| 2,600,701 | Statham | June 17, 1952 |
| 2,722,587 | Buzzetti et al. | Nov. 1, 1955 |
| 2,796,503 | Ward | June 18, 1957 |